United States Patent
Jessen et al.

(10) Patent No.: US 12,370,728 B2
(45) Date of Patent: Jul. 29, 2025

(54) SACRIFICIAL ADDITIVELY MANUFACTURED MOLDS FOR USE IN INJECTION MOLDING PROCESSES

(71) Applicant: Nexa3D ApS, Taastrup (DK)

(72) Inventors: Jon Jessen, Veksø (DK); Lasse Guldborg Staal, Jyllinge (DK); Tanya H. Olsen, Kgs. Lyngby (DK); Thore Langholz, København (DK)

(73) Assignee: Stratasys, Inc., Minnetonka, MN (US)

(*) Notice: Subject to any disclaimer, the term of this patent is extended or adjusted under 35 U.S.C. 154(b) by 0 days.

(21) Appl. No.: 18/610,918

(22) Filed: Mar. 20, 2024

(65) Prior Publication Data
US 2024/0269902 A1 Aug. 15, 2024

Related U.S. Application Data

(62) Division of application No. 16/631,098, filed as application No. PCT/EP2018/069073 on Jul. 13, 2018, now Pat. No. 11,969,918.

(30) Foreign Application Priority Data

Jul. 14, 2017 (DK) .................. 2017 70573
Sep. 13, 2017 (DK) .................. 2017 70689

(51) Int. Cl.
*B29C 33/52* (2006.01)
*B22F 10/64* (2021.01)
(Continued)

(52) U.S. Cl.
CPC .............. *B29C 33/52* (2013.01); *B22F 10/64* (2021.01); *B22F 10/68* (2021.01);
(Continued)

(58) Field of Classification Search
CPC ................ B29C 33/52; B29C 33/3835; B29C 33/3842; B29C 33/40; B29C 2071/0045;
(Continued)

(56) References Cited

U.S. PATENT DOCUMENTS 5,173,220 A 12/1992 Reiff et al.
5,242,646 A 9/1993 Torigoe et al.
(Continued)

FOREIGN PATENT DOCUMENTS

CN 103801696 A 5/2014
DE 102010013809 A1 11/2010
(Continued)

OTHER PUBLICATIONS

Danish Patent and Trademark Office; Search Opinion for Danish Patent Application No. PA 2017 70689, dated May 4, 2018 (7 pages).
(Continued)

*Primary Examiner* — Galen H Hauth
*Assistant Examiner* — Baileigh Kate Darnell
(74) *Attorney, Agent, or Firm* — Faegre Drinker Biddle & Reath LLP

(57) ABSTRACT

Sacrificial additively manufactured molds having a dissolvable material for use in thermoplastic injection molding processes at plastic melt temperatures in the range of 70-450 degrees C. and injection pressure in the range of 0.2-400 MPa. A method of producing a molded article using said sacrificial additively manufactured molds is also disclosed.

13 Claims, 5 Drawing Sheets

(51) Int. Cl.

| | |
|---|---|
| *B22F 10/68* | (2021.01) |
| *B29C 33/38* | (2006.01) |
| *B29C 33/40* | (2006.01) |
| *B29C 45/26* | (2006.01) |
| *B29C 45/44* | (2006.01) |
| *B29C 64/124* | (2017.01) |
| *B33Y 10/00* | (2015.01) |
| *B33Y 80/00* | (2015.01) |
| *B22F 10/25* | (2021.01) |
| *B22F 10/28* | (2021.01) |

(52) U.S. Cl.
   CPC ...... *B29C 33/3835* (2013.01); *B29C 33/3842* (2013.01); *B29C 33/40* (2013.01); *B29C 45/26* (2013.01); *B29C 45/4457* (2013.01); *B29C 64/124* (2017.08); *B33Y 80/00* (2014.12); *B22F 10/25* (2021.01); *B22F 10/28* (2021.01); *B33Y 10/00* (2014.12)

(58) Field of Classification Search
   CPC .......... B22F 10/68; B22F 10/64; B22F 10/25; B22F 10/28; B22F 2998/10; B22F 2999/00; B22F 5/007; B22F 3/225; B20C 45/26; B20C 45/4457; B33Y 10/00; B33Y 40/20; B33Y 70/00; B33Y 80/00; Y02P 10/25
   USPC ...................................................... 264/497
   See application file for complete search history.

(56) References Cited

U.S. PATENT DOCUMENTS

| | | | |
|---|---|---|---|
| 5,782,286 A | 7/1998 | Sommerich | |
| 6,375,880 B1 | 4/2002 | Cooper et al. | |
| 6,413,698 B1 * | 7/2002 | Tamura | B33Y 70/00 560/183 |
| 6,609,043 B1 | 8/2003 | Zoia et al. | |
| 11,274,169 B2 | 3/2022 | Bredemeyer et al. | |
| 2005/0006047 A1 | 1/2005 | Wang et al. | |
| 2005/0173839 A1 * | 8/2005 | Crump | B29C 33/3842 264/401 |
| 2005/0240303 A1 | 10/2005 | Smith | |
| 2006/0001190 A1 | 1/2006 | Priedeman, Jr. et al. | |
| 2006/0078638 A1 | 4/2006 | Holmboe et al. | |
| 2007/0178246 A1 | 8/2007 | Biro et al. | |
| 2011/0045120 A1 | 2/2011 | Higashi et al. | |
| 2011/0068502 A1 | 3/2011 | Basseas | |
| 2012/0193841 A1 | 8/2012 | Wang et al. | |
| 2012/0274005 A1 | 11/2012 | Bailey et al. | |
| 2013/0220570 A1 | 8/2013 | Sears et al. | |
| 2015/0035200 A1 | 2/2015 | Karpas et al. | |
| 2015/0044623 A1 | 2/2015 | Rundlett | |
| 2015/0144284 A1 | 5/2015 | Snyder et al. | |
| 2015/0190964 A1 | 7/2015 | Okamoto | |
| 2015/0190965 A1 | 7/2015 | Okamoto | |
| 2015/0210007 A1 | 7/2015 | Durand et al. | |
| 2015/0375419 A1 | 12/2015 | Günther et al. | |
| 2016/0067766 A1 | 3/2016 | Verreault et al. | |
| 2016/0354981 A1 | 12/2016 | Bredemeyer et al. | |
| 2017/0028641 A1 | 2/2017 | Okamoto | |
| 2017/0259507 A1 | 9/2017 | Hocker | |
| 2018/0264719 A1 | 9/2018 | Rolland et al. | |
| 2018/0327527 A1 * | 11/2018 | Bredemeyer | B33Y 10/00 |

FOREIGN PATENT DOCUMENTS

| | | | | |
|---|---|---|---|---|
| EP | 1495820 | A1 | 1/2005 | |
| EP | 1497093 | A1 | 1/2005 | |
| EP | 2842980 | A1 | 3/2015 | |
| GB | 2515773 | A | 1/2015 | |
| JP | 2000330468 | A | 11/2000 | |
| JP | 2005523178 | A | 8/2005 | |
| JP | 2012000966 | A | 1/2012 | |
| JP | 2015036420 | A | 2/2015 | |
| WO | 2000051761 | A1 | 9/2000 | |
| WO | 2015112583 | A1 | 7/2015 | |
| WO | 2015112885 | A1 | 7/2015 | |
| WO | 2017112653 | A1 | 6/2017 | |
| WO | 2017157851 | A1 | 9/2017 | |
| WO | WO-2017187133 | A1 * | 11/2017 | .............. B22F 3/225 |

OTHER PUBLICATIONS

Danish Patent and Trademark Office; Search Report for Danish Patent Application No. PA 2016 70149, dated Nov. 23, 2016 (4 pages).
International Search Report for Application No. PCT/EP2017/055841, mailed Jun. 1, 2017 (4 pages).
International Search Report for Application No. PCT/EP20181069073, mailed Sep. 27, 2018 (4 pages).
Third Party Observations submitted in corresponding European Patent Application No. 18740214.4, dated May 15, 2023 (5 pages).
Written Opinion of International Searching Authority for Application No. PCT/EP2017/055841, mailed Jun. 1, 2017 (7 pages).
Written Opinion of International Searching Authority for Application No. PCT/EP20181069073, mailed Sep. 27, 2018 (7 pages).
Z. Stanimirovic et al.; "Some Critical Issues for Injection Molding, Chapter 6: Ceramic Injection Molding"; Publisher: InTech Republic of Serbia; published online Mar. 23, 2013; published in print edition Mar. 2012; pp. 131-149 (19 pages).
Corrected Notice of Allowability dated Jan. 24, 2024, for U.S. Appl. No. 16/631,098 (filed Jan. 14, 2020), 4 pgs.
Amendment under 37 CFR 1.312 filed Dec. 26, 2023, for U.S. Appl. No. 16/631,098 (filed Jan. 14, 2020), 7 pgs.
Notice of Allowance dated Dec. 22, 2023, for U.S. Appl. No. 16/631,098 (filed Jan. 14, 2020), 8 pgs.
Amendment filed Sep. 12, 2023, for U.S. Appl. No. 16/631,098 (filed Jan. 14, 2020), 8 pgs.
Non-Final Office Action dated Jun. 12, 2023, for U.S. Appl. No. 16/631,098 (filed Jan. 14, 2020), 12 pgs.
Amendment filed Apr. 17, 2023, for U.S. Appl. No. 16/631,098 (filed Jan. 14, 2020), 12 pgs.
Advisory Action dated Mar. 6, 2023, for U.S. Appl. No. 16/631,098 (filed Jan. 14, 2020), 5 pgs.
Examiner Interview Summary dated Feb. 8, 2023, for U.S. Appl. No. 16/631,098 (filed Jan. 14, 2020), 2 pgs.
Amendment filed Feb. 6, 2023, for U.S. Appl. No. 16/631,098 (filed Jan. 14, 2020), 9 pgs.
Final Office Action dated Dec. 15, 2022, for U.S. Appl. No. 16/631,098 (filed Jan. 14, 2020), 10 pgs.
Amendment filed Aug. 15, 2022, for U.S. Appl. No. 16/631,098 (filed Jan. 14, 2020), 9 pgs.
Non-Final Office Action dated May 13, 2022, for U.S. Appl. No. 16/631,098 (filed Jan. 14, 2020), 9 pgs.
Amendment filed Jan. 21, 2022, for U.S. Appl. No. 16/631,098 (filed Jan. 14, 2020), 6 pgs.
Restriction Requirement dated Nov. 24, 2021, for U.S. Appl. No. 16/631,098 (filed Jan. 14, 2020), 8 pgs.

* cited by examiner

SACRIFICIAL ADDITIVELY MANUFACTURED MOLDS FOR USE IN INJECTION MOLDING PROCESSES

RELATED APPLICATIONS

This is a DIVISIONAL of U.S. Application No. 16/631,098, filed Jan. 14, 2020 (now issued as U.S. Pat. No. 11,969,918), which is a 371 National Stage of International Application No. PCT/EP2018/069073, filed Jul. 13, 2018, which claims priority from Denmark Application No. PA 2017 70573, filed Jul. 14, 2017, and Denmark Application No. PA 2017 70689, filed Sep. 13, 2017, each of which is incorporated herein by reference.

FIELD OF THE INVENTION

The invention relates to sacrificial additively manufactured molds consisting of a dissolvable material for use in thermoplastic injection molding processes at plastic melt temperatures in the range of 70-450 degrees C. and injection pressures in the range of 0.2-400 MPa. The invention also relates to a method of producing a molded article using said sacrificial additively manufactured molds.

BACKGROUND

Additive manufacturing—also called 3D printing—has become an important tool, not only for product development but also for actual production of products. Rapid prototyping, iterative design and concept validation are three disciplines that are considerably facilitated by 3D printers.

A main drawback of 3D printing is, however, the limited selection of materials with current additive manufacturing technologies. For this reason, several manufacturers of additive manufacturing equipment and materials have begun looking for ways to combine the field of polymer additive manufacturing with the fields of casting or molding. In these combinations, the casts or molds are produced by polymer additive manufacturing where after the cast or molded articles are produced by casting or molding using the additively manufactured molds. The key rationale behind this merging is that the fields of casting and molding provide a wide selection of proven materials, while the field of polymer additive manufacturing provides the option of printing molds with complex geometries that have shorter delivery times than standard aluminum or steel inserts and may be easily modified to reflect changing design needs.

Two generic approaches are available for manufacturers wanting to combine polymer additive manufacturing with casting or molding.

A first approach is based on the polymer additive manufacturing of molds or mold inserts that are intended to be durable, and where a key objective is that the molds or mold inserts must be capable of withstanding a high number of repeated filling cycles. It is known from prior art that molds or mold inserts manufactured by polymer additive manufacturing have been adopted by manufacturers that use filling by thermoplastic injection molding for the manufacturing of a high number of identical components. Filling by thermoplastic injection molding is highly advantageous due to the low thermal capacity of the polymer molds, the high speeds of manufacturing and the wide selection of available thermoplastic materials. However, thermoplastic injection molding typically requires that a thermoplastic material (e.g. a plastic, rubber, or a powder/binder composite) is heated to between 70-450 degrees Celsius, and injected into a mold using pressures of between 0.2 and 400 MPa. Furthermore, injected materials (e.g. composite materials comprising glass fibers, metal powders or similar additives) may be highly abrasive and may have high thermal capacities. In addition, molding pressures may have to be sustained after initial injection to avoid suck-backs and ensure proper filling. Finally, the need to include drafts and parting lines—and to separate the mold to permit ejection of the molded articles after filling—means that the geometrical freedom from additive manufacturing is lost. Particular challenges result where molded articles in soft and/or brittle materials and/or molded articles with delicate features are wanted, as these articles may not be possible to remove from the additively manufactured polymer mold or mold insert without breaking or distorting. Other particular challenges result where the use of movable cores, pulls, sliders and other mechanisms are needed for the molding of highly complex geometries, since those movable elements will produce to the rapid breakdown of the additively manufactured polymer molds or mold inserts.

An alternative approach is based on the polymer additive manufacturing of molds that are sacrificial, and where a key objective is that the molds can be disintegrated after filling to permit the manufacturing of complex objects with geometries that cannot be injection-molded. It is known from prior art that this principle has been adopted by manufacturers that use sacrificial additively manufactured molds for casting of thermosetting materials that may or may not be heat-treated after filling. The use of additively manufactured sacrificial molds is advantageous as it allows the manufacturing of highly complex shapes without the need for parting lines. At the same time, the combination of single-use molds and gravity pouring or lower-pressure injection means that handling of abrasive composite materials becomes less of a problem. However, the range of available thermosetting materials is considerably narrower than the range of available thermoplastic materials, and the speed of manufacturing is considerably slower as the thermosetting parts will have substantially slower curing or solidification rates than the thermoplastic materials used in injection molding.

By way of example, U.S. patent application No. US 2016/0354981 is directed to an apparatus and a method for in-situ casting by means of hybrid manufacturing. In this hybrid manufacturing process, the apparatus both prints the mold and fills the mold with a thermosetting material while the mold is still situated within the apparatus. After curing of the molded article, the mold is disposed of preferably by dissolving the mold. It is claimed that the hybrid manufacturing process increases the speed at which products could be manufactured and reduces the cost and difficulty of manufacturing products. The document specifically discloses the use of thermosetting materials that are pre-mixed and degassed prior to filling, and further discloses methods for filling of molds while these are still held in the additive manufacturing apparatus. Finally, the document specifies heating up materials as they cure to speed up curing.

Another example is U.S. Pat. No. 6,609,043, which discloses a method for constructing a structural foam part. The method comprises three steps. Step one uses a rapid prototyping process, such as for example stereolithography, to create a polymer mold. Step two requires filling the polymer mold with a material. The document specifically discloses filling the mold with a low-viscosity slurry by pouring under the force of gravity. Alternative filling methods include the pumping of material or the chemical vapor deposition of material. The last step calls for heating the polymer mold and the material to heat set the material and to remove the polymer mold due to pyrolising the mold material and thereby forming the structural foam part.

As a third example, US patent application US 2015/0375419 discloses a method for producing casting molded parts where a water-soluble casting mold is produced in a first step using a layering method and in particular using a powder bed-based layering method. In a second step, the surface of the casting mold is sealed with a water-insoluble material and then a casting of the molded part is formed by filling the casting mold with a free-flowing hardenable material, in particular a hydraulically setting material. After the casting has solidified, the casting mold is dissolved with the aid of an aqueous solution and in particular a heated aqueous solution.

Each of the approaches described above have important advantages that have helped advance the combination of polymer additive manufacturing with casting/molding. However, it remains a key limitation that the materials disclosed by prior art and intended for polymer additive manufacturing of molds or mold inserts for repeated use do not have sufficient durability and wear resistance to support repeated processing of abrasive materials and/or the processing of materials at elevated temperatures and/or pressures. It remains another key limitation that materials disclosed by prior art and intended for polymer additive manufacturing of molds or mold inserts for repeated do not support the smooth ejection of molded articles of soft and/or brittle materials. It remains yet another key limitation that materials disclosed by prior art and intended for polymer additive manufacturing of molds or mold inserts for repeated use do not have the durability, mechanical stability or wear resistance to support the use of movable mold tool elements, such as retractable cores, pulls or slides.

At the same time, it remains a key limitation that the methods disclosed by prior art for the manufacturing of molded articles by means of sacrificial molds do not disclose means for distributing sequential process steps on multiple discrete units to ensure highest possible throughputs and to avoid production bottlenecks. It remains another key limitation that the materials disclosed by prior art and intended for additive manufacturing of sacrificial molds are intended for thermoset materials and do not have the mechanical or thermal stability required for use in thermoplastic injection molding processes at high temperatures and pressures.

Accordingly, there is an unmet need for devices, methods and materials that resolve at least some of these limitations.

SUMMARY OF THE INVENTION

It is an object of the present invention to provide additively manufactured sacrificial molds consisting of dissolvable material that may be used for thermoplastic injection molding processes at plastic melt temperatures in the range of 70-450 degrees C. and injection pressures in the range of 0.2-400 MPa. Accordingly, the invention provides dissolvable materials that may be processed by means of additive manufacturing, such as for example photopolymerization, to create sacrificial molds that are suitable for thermoplastic injection molding processes at high plastic melt temperatures and injection pressures. In particular the molds are suitable for Sacrificial Thermoplastic Injection Molding (STIM). Such materials will also be highly useful for investment casting and other applications that require high resolution, high surface quality and solubility.

It is also an object of this invention to provide a device ("mold tool") that may exploit, complement and enhance the additively manufactured sacrificial molds to support their usefulness in Sacrificial Thermoplastic Injection Molding (STIM).

It is yet a further object of the present invention to provide a method of producing a molded article comprising the steps of:
a. printing a sacrificial additively manufactured mold consisting of a dissolvable material,
b. post-processing the mold obtained in step a,
c. filling the mold obtained in step b with building material,
d. processing the building material of step c in order to produce a molded article inside the mold,
e. dissolving the mold in order to release the molded article obtained in step d, and
f. optionally rinsing the molded article.

It is yet a further object of this invention to provide a method, in particular a STIM method that exploits the mold materials, and optionally the mold tool, to create injection-molded articles that may have any desired shape and geometry and may be made of any desired material.

DETAILED DESCRIPTION

As disclosed above, it is an object of the present invention to provide additively manufactured sacrificial molds consisting of dissolvable material that may be used for thermoplastic injection molding processes at plastic melt temperatures in the range of 70-450 degrees C. and injection pressures in the range of 0.2-400 MPa.

A sacrificial mold is a single-use mold that is sacrificed when the molded article is released from the mold, for example by use of mechanical means, high temperature, such as pyrolysis or by chemical means, such as dissolving.

By the term "sacrificial mold" as used herein is meant a mold unit consisting of at least an outer shell made in a dissolvable material that surrounds and encloses at least one mold cavity having at least one inlet and at least one outlet. The molds disclosed herein are capable of sustaining plastic melt temperatures in the range of 70-450 degrees C. and injection pressures in the range of 0.2-400 MPa and are suitable for use in thermoplastic injection molding processes. During the injection molding process, the mold cavity is filled with building material by injecting the building material into the cavity of the mold through the mold inlet while air may escape—or vacuum may be applied—through the outlet. Preferred examples of molds are shown in FIGS. 6 and 7.

The sacrificial additively manufactured mold may be manufactured by selectively curing a liquid resin formulation. The resin formulation is a dissolvable resin formulation, which means that after printing the mold and filling it with a desired building material to create a molded object, the cured resins can react with water or another solvent whereby the printed mold is dissolved to release the molded object.

Figure 5:
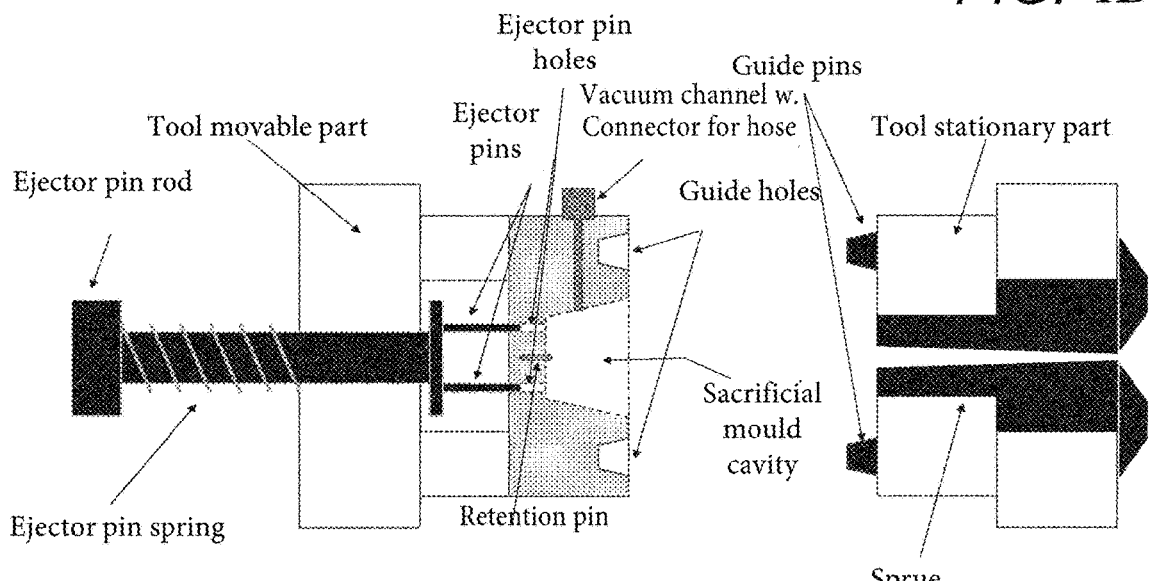
FIG. 5 schematically illustrates an exemplary embodiment of a molding system for manufacturing an object corresponding to the exemplary embodiment illustrated in FIG. 1 but where the tool movable part comprises a vacuum channel for use as disclosed herein.
Figure 6:
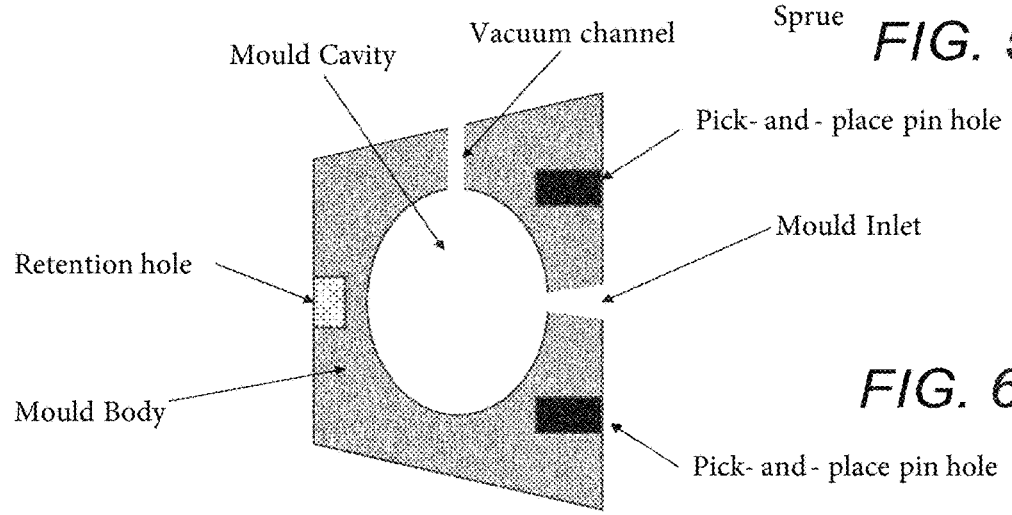
FIG. 6 schematically illustrates a single cavity sacrificial mold that has been released from a build plane or platform and is ready to be received e.g. by a molding system as shown in FIG. 5.
Figure 7:
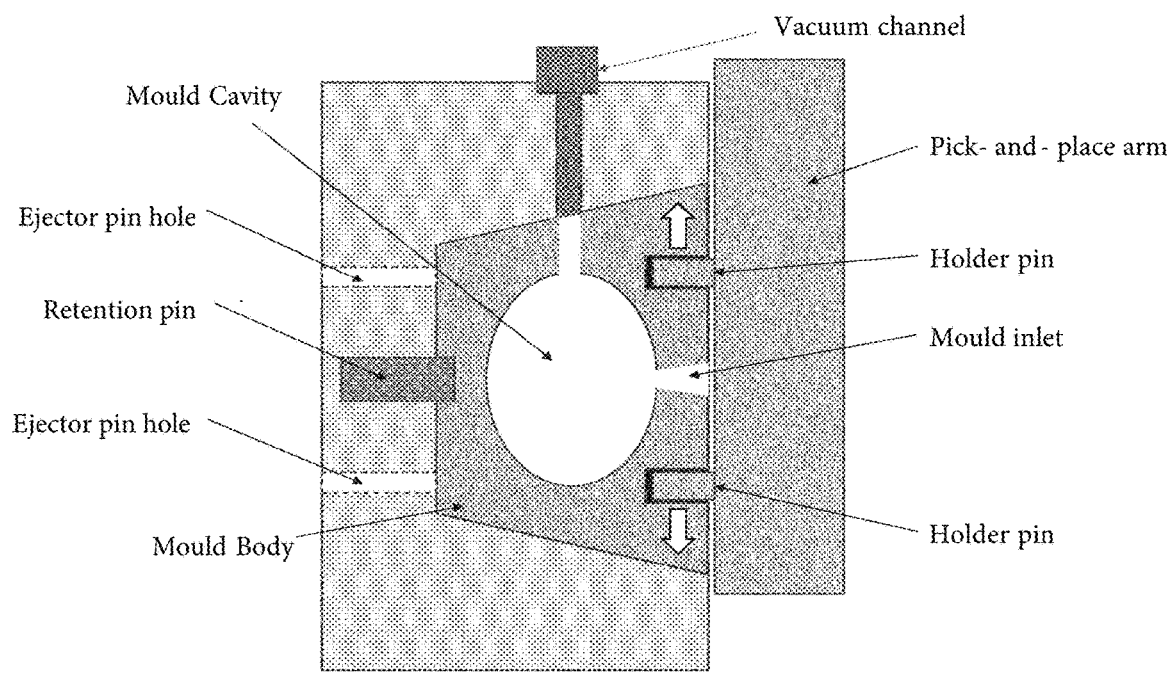
FIG. 7 schematically illustrates a single cavity sacrificial mold inserted in a tool movable part of a molding system.

In preferred embodiments, the sacrificial additively manufactured mold is manufactured by the additive manufacturing system shown in FIG. 5 or FIG. 6 in International patent application PCT/EP2017/055841, which is incorporated herein by reference.

The dissolvable resin formulation may comprise any known dissolvable resin or mixture of resins which fulfills the requirements of 1) being selectively curable so that molds can be additively manufactured, e.g. by a stereolithographic process, and where 2) said molds can withstand high plastic melt temperatures and injection pressures during a mold filling process and where 3) said molds can be dissolved when brought in contact with an appropriate solvent.

In an embodiment, the dissolvable resin formulation comprises at least one of 4-(1-oxo-2-propenyl)-morpholine, trimethylolpropane(EO)9 triacrylate, polyethylene glycol 200 diacrylate, sucrose benzoate, modified acrylate polyester and modified acrylate polyethylene polyol.

By the term "modified acrylate polyester" as used herein is meant chemical modification of acrylate polyester, and in particular polyethylene glycol modification of the acrylate polyester. By the term "modified acrylate polyethylene polyol" as used herein is meant chemical modification of acrylate polyethylene polyol, and in particular amine modification of acrylate polyethylene polyol, such as for example reaction with the tertiary amine group on tri (N-phenothiazinyl) triphenylamine (TPTTA).

In a particular embodiment, the dissolvable resin formulation comprises at least one of 4-1-oxo-2-propenyl)-morpholine, (trimethylolpropane(EO)9 triacrylate, polyethylene glycol 200 diacrylate, sucrose benzoate, polyethylene glycol modified acrylate polyester and amine modified acrylate polyethylene polyol.

In another embodiment, the dissolvable resin formulation comprises at least one of 4-(1-oxo-2-propenyl)-morpholine, trimethylolpropane(EO)9 triacrylate, polyethylene glycol 200 diacrylate and sucrose benzoate.

In another embodiment which is e.g. suitable for STIM of polypropylene, the dissolvable resin formulation comprises at least one of 4-(1-oxo-2-propenyl)-morpholine, trimethylolpropane(EO)9 triacrylate, polyethylene glycol 200 diacrylate, sucrose benzoate, modified acrylate polyester and modified acrylate polyethylene polyol.

In a particular embodiment which is e.g. suitable for STIM of polypropylene, the dissolvable resin formulation comprises at least one of 4-(1-oxo-2-propenyl)-morpholine, trimethylolpropane(EO)9 triacrylate, polyethylene glycol 200 diacrylate, sucrose benzoate, polyethylene glycol modified acrylate polyester and amine modified acrylate polyethylene polyol.

In another embodiment which is e.g. suitable for STIM of polypropylene, the dissolvable resin formulation comprises at least one of 4-(1-oxo-2-propenyl)-morpholine, trimethylolpropane(EO)9 triacrylate, polyethylene glycol 200 diacrylate and sucrose benzoate.

Other embodiments may be tailored to suit specific properties of the intended building material.

To permit additive manufacturing by means of photopolymerization or similar means, the dissolvable resin formulation may further comprise a curing agent. The type of curing agent depends on the resin in the formulation and the preferred method for curing. In some embodiments, the dissolvable resin is intended to be radiation curable, also known as energy curable, and in such cases the resin is cured by applying for example ultraviolet light or electron beam radiation to the resin formulation.

In one embodiment the dissolvable resin formulation comprises an UV curable agent such as diphenyl (2,4,6-trimethylbenzoyl) phosphine oxide, which is known to act as a photo-initiator, and a UV-blocker, such as for example benzoxazole, 2,2'-(thiophene diyl)bis[5-(1,1-dimethylethyl). A stabilizer, such as for example a polymerization inhibitor, such as for example Genorad 20, may be added to prolong shelf life.

The dissolvable resin formulation may comprise further additives that may promote desired properties. In particular, in one embodiment the dissolvable resin formulation further comprises an agent capable of promoting a thermal post-curing that may for example be selected from the group consisting of epoxies, blocked isocyanates and powdered aluminum. In a specific embodiment, the epoxy may be Monopox 6093 purchased from Delo AG. It is believed that the addition of Monopox 6093 will provide higher mechanical strength, thermal stability and thermal capacity to the additively manufactured mold, and such addition is therefore considered highly attractive for demanding applications. In another embodiment, the blocked isocyanate may be methyl ethyl ketoxime. Methyl ethyl ketoxime is characterized by having a first stage where the blocked isocyanates are dormant and a second stage that occurs above a certain temperature threshold (e.g. 120-140 degrees C., for methyl ethyl ketoxime) where the isocyanates are unblocked to support a post-curing. Other embodiments may for instance comprise optical brighteners (such as Stilbenes or Benzoxazole) or other UV blockers that allow precise control over curing depth and/or polymerization inhibitors (such as hydroquinone or Genorad) that prolong the useful shelf life of the dissolvable resin.

It is a further object of the present invention to provide a method for producing a molded article comprising the steps of:
a. printing a sacrificial additively manufactured mold consisting of a dissolvable material,
b. post-processing the mold obtained in step a,
c. filling the mold obtained in step b with building material,
d. processing the building material of step c in order to produce a molded article inside the mold,
e. dissolving the mold in order to release the molded article obtained in step d, and
f. optionally rinsing the molded article.

In step a, a sacrificial additively manufactured mold is produced by printing a resin formulation comprising dissolvable resins. Examples of dissolvable resins that are suitable for such applications are mentioned above.

In principle any kind of known printing process can be used, such as for example photopolymerization (e.g. UV—Digital Light Processing (DLP), UV, laser, LCD or stencil Stereolithography (SL)), continuous liquid interface production (CLIP), Fused deposition Modelling (FDM), Selective Laser Melting (SLM), Material jetting, Binder jetting, optical fabrication, photo-solidification, solid free-form fabrication, solid imaging and other 3D printing systems, a (selective) laser sintering system, a protrusion system, an extrusion-based 3D printer system, a 3D bio-printing or bio-plotting system, a dropletrinklet-based system, a powder bed fusion system or a directed energy deposition system. In cases where complex geometries, high tolerances, high resolutions, high surface qualities and/or high repeatability are required, the UV DLP process and the SL process are preferred.

To achieve highest precision in the manufacturing of precision objects by means of DLP or SL, a first curing/solidification takes place during build-up in the additive manufacturing unit, and serves the purpose of setting the desired shape of the individual layers of the additively manufactured molds and ultimately the entire mold. Ideally, this first curing/solidification is only partial because complete curing of each individual layer will lead to internal stresses, warpage, loss of strength and other undesired artifacts. To achieve full strength with minimal geometrical distortion, it is desirable to clean the additively manufactured molds after printing, and subsequently carry out a second (post)curing of the additively manufactured molds, as further described below. Cleaning and post-curing may advantageously be performed by post-processing systems that are separate from the additive manufacturing apparatus, to ensure highest possible utilization of the additive manufacturing apparatus and to prevent bottlenecks. A suitable post-processing system is the one disclosed in International Patent Application PCT/EP2017/055841 on page 44, line 14-page 46, line 2 and shown in FIG. 12, item 600, which is incorporated herein by reference.

Accordingly, in step b, the sacrificial additively manufactured mold is post-processed so that a Ready-To-Fill (RTF) mold is obtained.

The post-processing comprises at least one of the following steps: cleaning the mold, drying the mold, surface-treating the mold and post-curing the mold.

Cleaning the mold is of particular importance where DLP or SL is used, and may include in particular a rinsing procedure in which the mold is immersed in a bath of isopropanol, TPM (Tripropylene Glycol Methyl Ether) or a similar solvent to remove uncured material. If cleaning is not carried out, uncured material may interfere with the filling process, e.g. by pooling in bottom portions of the mold. Such interference may result in loss of geometrical accuracy, incompletely molded objects, contamination of injection molding equipment and/or other undesired artefacts. Optionally the rinsing procedure is performed at elevated temperature, ultrasonication, agitation, stirring, vacuum aspiration or any combinations thereof.

Drying the mold during or after cleaning includes any well-known drying method and in particular may include using a vacuum drying process and/or an oven drying process and/or a chemical drying process.

Surface-treating the mold during or after cleaning includes any surface-treating method known in the art, and in particular may include immersing the mold in a bath comprising a surface-treating agent. In some embodiments, the surface-treating agent is a solute of the mold material, which may e.g. provide a smoothening of a surface. In another embodiment the surface-treating agent is a solvent promoting dissolution of the mold. In yet another embodiment the surface-treating agent is a structural surface agent, such as for example an agent comprising microbeads or other materials that may be made to infiltrate the surface of the molded object.

As disclosed above, post-curing of the mold is of particular importance where DLP or SL is used for the manufacturing of precision sacrificial molds, especially where mold wall thicknesses need to be increased to accommodate higher temperatures and/or pressures. Such post-curing may include any well-known post-curing method and in particular placing the mold in a reflective chamber and subjecting the mold to UV radiation and/or placing the mold in an oven and subjecting the mold to joule heating, microwave heating or another means of thermal energy and/or placing the mold in an environment (for example water) that is conductive for a specific type of chemical and/or thermal curing. To increase speed, ease of operation, while at the same time obtaining the desired post-curing effects, one or more post-curing principles may advantageously be combined in a single post-curing apparatus.

Alternatively or additionally, the inclusion of certain components or additives in the sacrificial mold material may help promote complete post-curing. The formulations disclosed above are characterized by being suitable for a hybrid curing regime where a first (photo)curing takes place during the printing, and allows the additive manufacturing of a mold with a desired geometry. A second curing takes place during the post-curing, and is intended to fully solidify the sacrificial mold for provision of highest possible strength. This second curing is preferably a thermal curing.

In step c, the sacrificial additively manufactured mold is filled with building material.

The building material includes, but is not limited to, a thermoplastic polymer, a thermoplastic elastomer, a thermoplastic composite, thermoplastic rubber, a thermoplastic feedstock comprising metal powders, a thermoplastic feedstock comprising ceramic powders and thermoplastic feedstocks comprising other suitable powders.

The filling of the mold can be done by any known injection molding method, such as for example thermoplastic injection molding, thermoplastic rubber injection molding, thermoplastic micro injection molding, thermoplastic powder injection molding (including thermoplastic metal injection molding and thermoplastic ceramic injection molding), thermoplastic blow molding, thermoplastic over molding, thermoplastic compression molding, thermoplastic insert molding or thermoplastic multi-shot molding.

Figure 9:
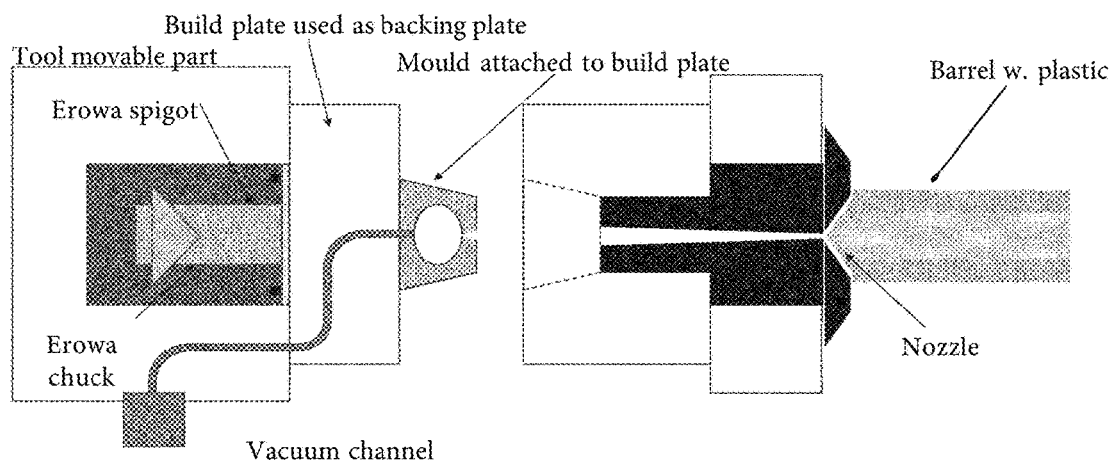
FIG. 9 schematically illustrates a molding system for manufacturing an object corresponding to the one in FIGS. 3 and 4A-4D but with a vacuum channel.

In preferred embodiments the filling of the mold with building material is performed as shown in FIG. 9, 10 or 11 in International patent application PCT/EP2017/055841, which is incorporated herein by reference.

In the present invention, the filling of the mold is done at plastic melt temperatures in the range of 70-450 degrees C. and injection pressures in the range of 0.2-400 MPa.

To increase speed, ease of use, it is often desirable to use mold tools and handling fixtures for efficient filling. For instance, it may be desirable to clamp a sacrificial mold in a suitably configured cavity or recess in a mold tool during filling, especially where higher temperatures and pressures are used, and where such clamping will help mitigate the risk of deformations that may result from such higher temperatures and pressures.

In one embodiment, the sacrificial mold is clamped by and/or supported by a mold tool before and during filling the mold in step c. In this embodiment, the cavity in the mold tool has dimensions that conform to the outer dimensions of the sacrificial mold which results in clamping or supporting of the sacrificial mold in the mold tool cavity.

In some cases, it may be that the sacrificial mold is smaller than the cavity in the mold tool and in such cases it is beneficial to use an insert that can adapt the size of the cavity in the mold tool so that the dimensions of the adapted mold tool conform with outer dimensions of the sacrificial mold so that the sacrificial mold is clamped and/or supported by the mold tool before and during filling of the mold. Hence, in one embodiment an insert is used to adapt the size of a mold tool to dimensions that conform the outer dimensions of the sacrificial mold whereby the sacrificial mold is clamped by and/or supported by said mold tool with adapted size before and during filling the mold in step c.

In a preferred embodiment, the sacrificial mold is clamped by and/or supported by a mold tool comprising a vacuum channel in fluid communication with the mold cavity. By introducing such vacuum channel, the filling of the mold is assisted by drawing a vacuum into said cavity prior to or during filling of the mold in step c. Examples of preferred mold having vacuum channels are shown for example in FIGS. 6, 7 and 8.

FIGS. 8A-8C, 9A-9H, 10A-10D, and 11A-11D and related description of co-pending PCT patent application with application number PCT/EP2017/055841 by the same applicant are hereby incorporated by reference.

Figure 1:
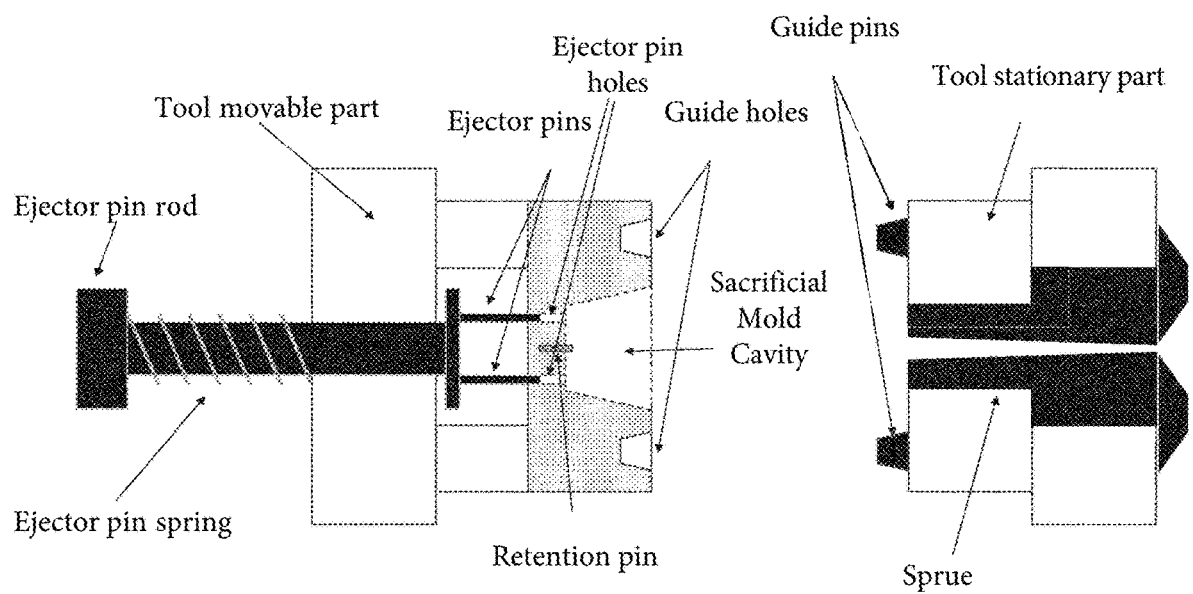
FIG. 1 schematically illustrates an exemplary embodiment of a molding system for manufacturing an object.

FIG. 1 schematically illustrates an exemplary embodiment of a molding system for manufacturing an object.

Shown is a molding system here in the form of an injection molding system.

The injection molding system comprises in this and corresponding embodiments, a tool stationary part and a tool movable part where the tool movable part comprises a sacrificial mold cavity. Said sacrificial mold cavity is configured to receive a sacrificial mold that is released or has been released from a build plane.

Figure 2:
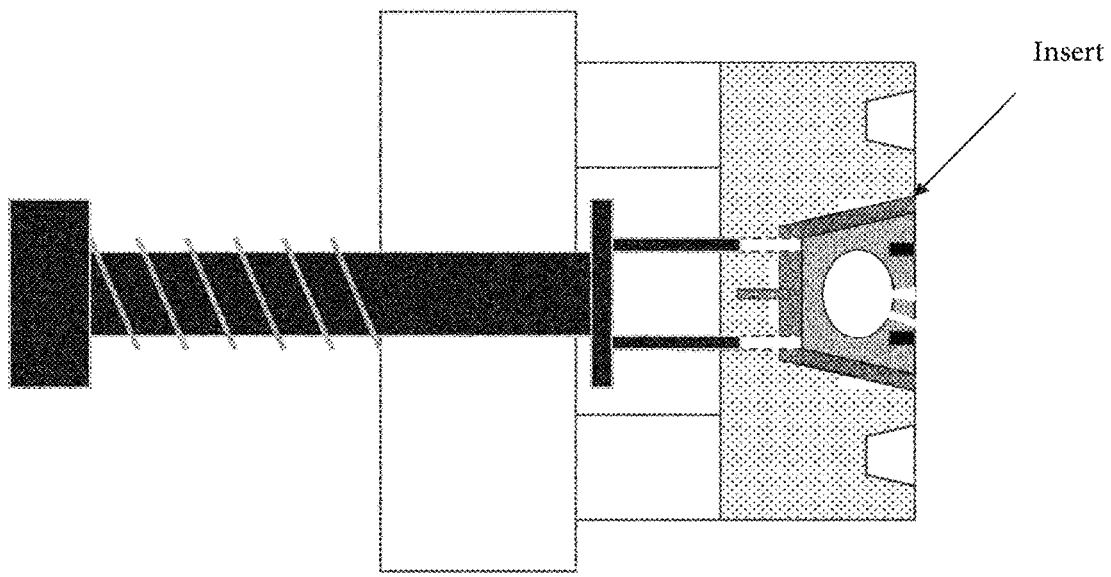
FIG. 2 schematically illustrates a tool movable part of an injection molding system comprising a sacrificial mold and an insert.

FIG. 2 schematically illustrates a tool movable part of an injection molding system comprising a sacrificial mold and an insert.

Shown is a molding system in the form of an injection molding system comprising a tool movable part where a sacrificial mold cavity of the tool movable part comprises an insert or the like to accommodate smaller sacrificial molds.

Figure 3:
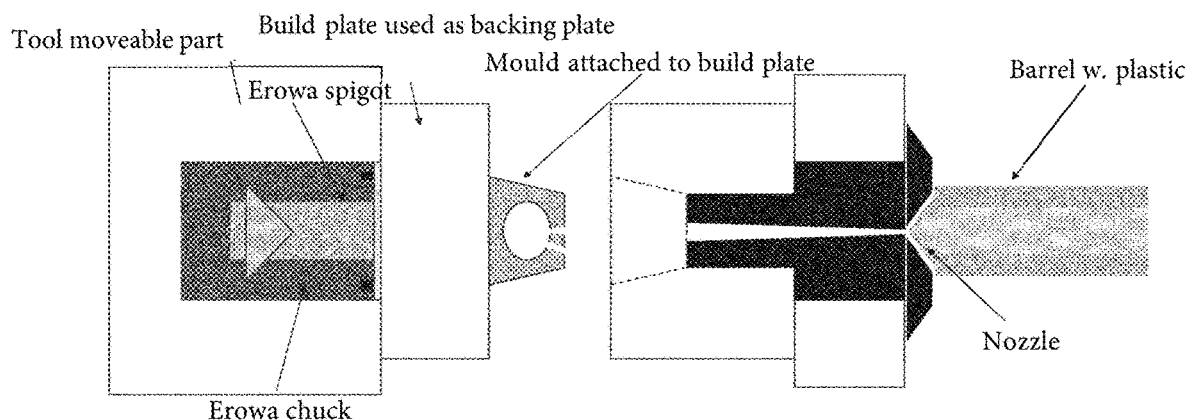
FIG. 3 schematically illustrates a molding system in the form of an injection molding system according to some embodiments.

FIG. 3 schematically illustrates a molding system in the form of an injection molding system according to some embodiments.

Shown is a molding system in the form of an injection molding system comprising a tool movable part according to some embodiments and a tool stationary part.

In this embodiment, the sacrificial mold is attached or secured to a build platform from an additive manufacturing apparatus that comprises one or more releasable securing elements. In the shown embodiment, the releasable securing element is an Erowa spigot or similar that is connected with a corresponding mating tool or equipment like a standardized industrial chuck. However, other mechanisms for releasably receiving, holding, and releasing a build plate or build platform from an additive manufacturing apparatus (e.g. stationary or slidable rails, grooves, pins, etc.) may be used for the releasable attachment of the build plate or platform to the tool movable part. In this and corresponding embodiments, the build platform is in the form of a build plate and functions as a backing plate for an attached mold, with the purpose of enabling a quick transfer of sacrificial molds into—and out of—the injection molding machine. In some embodiments, the transfer is manual, whereas other embodiments comprise means for automated transfer. Also, the backing plate is advantageous for certain types of relatively fragile molds.

FIGS. 4A-4D schematically illustrate a sacrificial one-piece additively manufactured mold and an exemplary embodiment of the molding system of FIG. 3, as well as the molding process used for manufacturing an object.

Figure 4A:
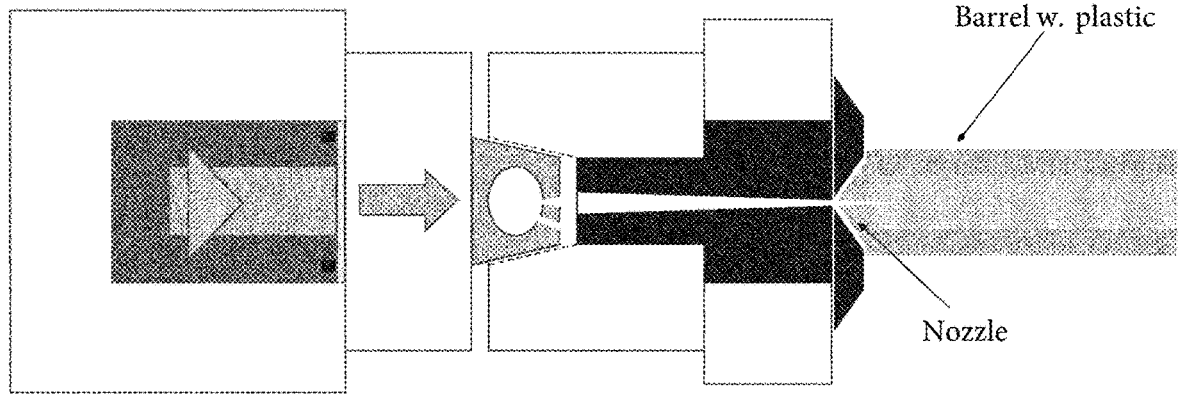
FIGS. 4A, 4B, 4C and 4D schematically illustrate a sacrificial one-piece additively manufactured mold and an exemplary embodiment of the molding system of FIG. 3, as well as the molding process used for manufacturing an object.
Figure 4B:
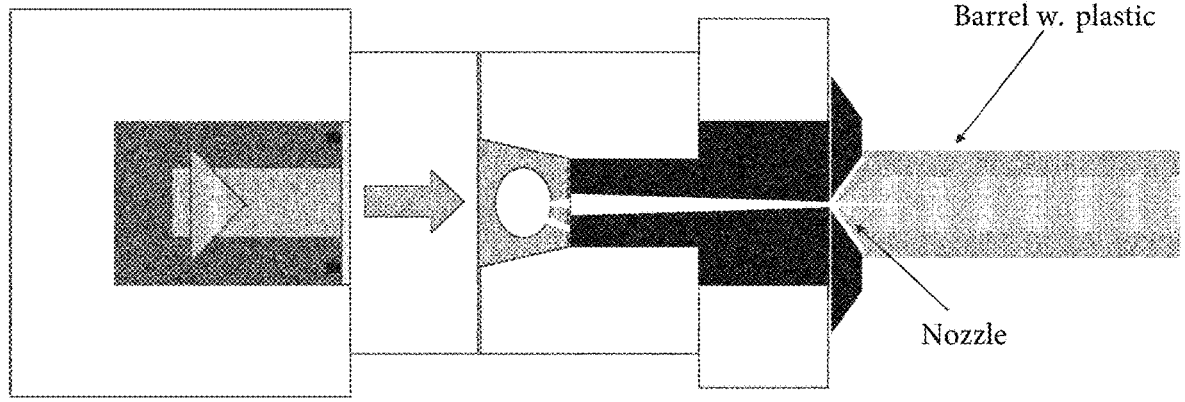
Figure 4C:
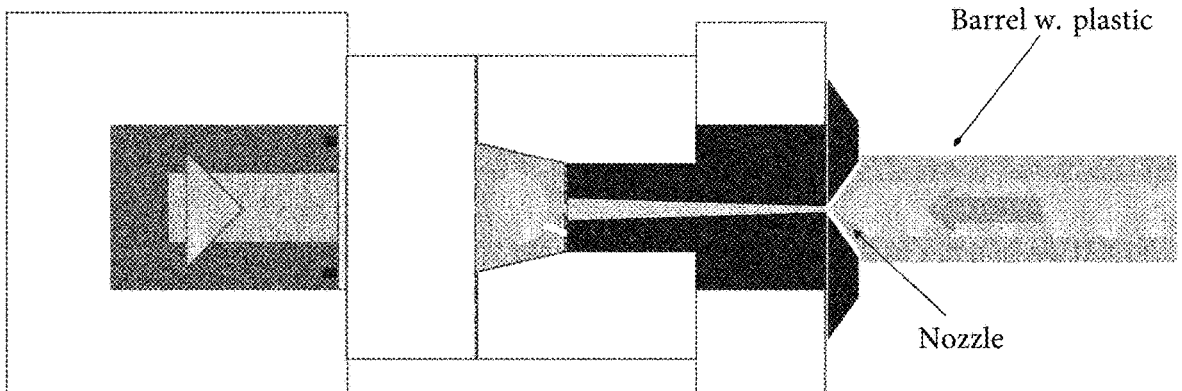
Figure 4D:
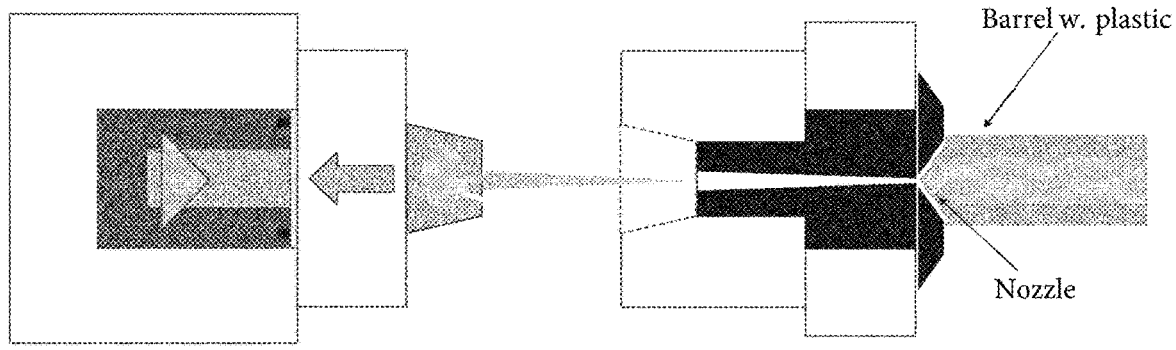

FIGS. 4D-4D illustrate different stages of a molding or object manufacturing process using an injection molding system of FIG. 3 and a sacrificial mold as disclosed herein.

In FIG. 4A, the tool movable part with a mold attached is moved towards the tool stationary part as indicated by the arrow.

In FIG. 4B, the tool movable part is (more or less) in place.

In FIG. 4C, at least one building material is introduced, as indicated by arrow, into a sprue or the like and further into the mold and filling it as part of the injection molding process.

In FIG. 4D, a molded object has been created and the tool movable part is moved away from the tool stationary part. Hardened material that is held in the sprue of the tool stationary part may be pulled along, which may create an unwanted part of the molded object that will need to be removed at a later stage.

In a specific embodiment, a mold tool is provided that has a configurable cavity. Said cavity may be dimensioned to receive a first larger sacrificial mold, and may comprise one or more inserts that will allow the stepwise or discreet reduction of the dimensions of said cavity to receive smaller sacrificial molds. This embodiment will allow the material-efficient manufacturing of a multitude of components having different sizes using the same mold tool, and will be particularly advantageous where sacrificial molds are detached from a build plate of an additive manufacturing apparatus prior to filling. The low thermal capacity of the individual mold, and the resulting negligent heat exchange between the mold and the building material, provides an additional advantage for this kind of applications as it may essentially eliminate the need for mold tool run-in and controlled mold temperature.

In another embodiment, a mold tool is provided that is configured to automatically receive and hold a build plate with a sacrificial mold still attached. This embodiment is particularly advantageous where STIM is based on an integrated, automated chain of additive manufacturing processes, and may be yet more optimal where multi-cavity sacrificial molds are used. For such applications, the build plate may serve as an automatically received backing plate of the (male) mold tool, and the sacrificial mold may be received in a (female) cavity corresponding with the outer contour of the sacrificial mold. Thus, the cost-efficient manufacturing of multiple components may be carried out in a single automated process. For a specific set of applications, a first sacrificial mold comprising one or more components having a first design may thus be automatically replaced by a second sacrificial mold comprising one or more components having a second design. The low thermal capacity of the individual mold, and the resulting negligent heat exchange between the mold and the building material, provides an additional advantage for this kind of applications as it may essentially eliminate the need for mold tool run-in and controlled mold temperature.

To reduce the pressure needed for complete and efficient filling of a mold, it is frequently desirable to combine or complement the injection process with a vacuum process. By using vacuum to allow a reduction in the pressure needed to fill a sacrificial mold, several advantages are obtained:
  a. 1. Mold wall thickness may be reduced, which will help save mold material while at the same time speeding up the mold manufacturing process
  b. 2. Speed of filling may be increased
  c. 3. Filling of complex geometries may be facilitated In some embodiments, a vacuum is drawn directly into the sacrificial mold cavity, e.g. by means of a vacuum hose that is attached to at least a first vacuum inlet on the sacrificial mold or, more rationally, to a suitable fixture on a mold tool. Alternatively, or complementarily, vacuum may be drawn into a vacuum chamber that is configured to completely surround and enclose the mold tool with the sacrificial mold.

FIG. 5 schematically illustrates an exemplary embodiment of a molding system for manufacturing an object corresponding to the exemplary embodiment illustrated in FIG. 1 but where the tool movable part comprises at least a first vacuum channel for use as disclosed herein.

As can be seen, the part of the tool movable part comprising guide holes and the sacrificial mold cavity comprises a portion of vacuum channel with a connector for a hose or similar. An end of the vacuum channel opposite the end with the connector terminates in the sacrificial mold cavity.

FIG. 6 schematically illustrates a single cavity sacrificial mold that has been released from a build plane or platform, and is ready to be received e.g. by a molding system as shown in FIG. 5.

As can be seen, the mold comprises at least a first vacuum channel aligning in use (see e.g. FIG. 7) with a vacuum channel of the molding system. In this and corresponding embodiments, the vacuum channel replaces the mold air outlet that is connected to the inner volume of the mold to release air from the inner volume when it receives a building material via an inlet.

FIG. 7 schematically illustrates a single cavity sacrificial mold inserted in a tool movable part of a molding system.

Shown is a single cavity sacrificial mold attached to a transportation mechanism, e.g. a pick-and-place arm or similar, being adapted to automatically move a one-piece additively manufactured mold where the mold is properly inserted in a tool movable part of a molding system so the respective vacuum channels of the mold and the tool movable part align. In the shown embodiment, a pick-and-place arm is used for transport of the sacrificial mold. In alternative embodiments (not shown), the sacrificial mold is transported (e.g. by a robot arm) while still held on the build platform of the additive manufacturing apparatus. In such embodiments, the sacrificial mold cavity is released from said platform once it has been positioned in the sacrificial mold cavity of the tool movable part, e.g. by transiently cooling said build platform to generate a releasing thermal shrinkage.

Figure 8:
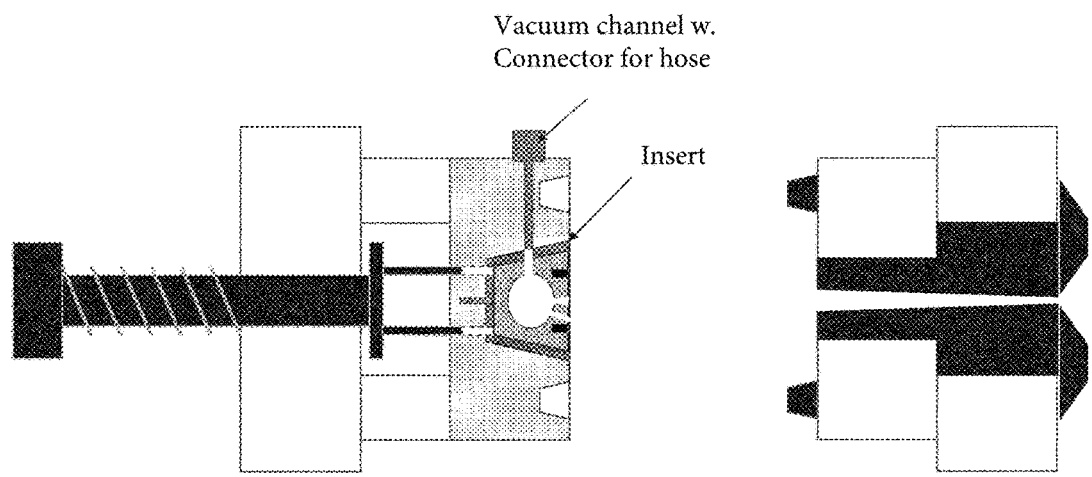
FIG. 8 schematically illustrates a molding system for manufacturing an object corresponding to the one in FIG. 5 with an insert having a vacuum channel.

FIG. 8 schematically illustrates a molding system for manufacturing an object corresponding to the one in FIG. 5, with an insert having a vacuum channel.

The insert is configured to facilitate receipt of sacrificial molds that are smaller than the sacrificial mold cavity of the tool movable part where said insert has a vacuum channel.

Shown is a molding system corresponding to the one in FIG. 5 and an insert corresponding to the one of FIG. 2 except that this insert comprises a vacuum channel aligning, in use, with the respective vacuum channels of the inserted mold and the molding system.

FIG. 9 schematically illustrates a molding system for manufacturing an object corresponding to the one in FIGS. 3 and 4A-4D but with a vacuum channel.

Shown is a molding system corresponding to the one in FIGS. 3 and 4A-4D having an Erowa-based backing plate but according to this and corresponding embodiments further having a vacuum channel and connector where the vacuum channel, in use, aligns with the vacuum channel of the mold (as shown) or an insert.

In some embodiments, the build plate functioning as a backing plate for an attached mold is additively manufactured, which enables complex geometries of the vacuum channel of the build plate.

In step d, the building material is processed so that a molded article is produced. Such process step is well-known in the art and typically includes dwelling and cooling of the building material inside of the mold. When sacrificial polymer molds are used, the lower thermal capacity of the sacrificial polymer molds, compared with aluminum or steel tools may cause prolonged dwell times and cooling times as compared with standard injection molding. However, sacrificial molds may be removed from the injection molding machine as soon as the building material has set enough to allow separation without suck-back, which will help increase total through-put and reduce injection mold cycle times.

In step e, the sacrificial additively manufactured mold is dissolved, whereby the molded article is released.

The dissolution of the mold can be performed for example by immersing the mold with the molded article in a solvent, such as water, an inorganic solvent or an organic solvent. Suitable examples of solvents include, but are not limited to water, sodium hydroxide, limonene, acetone and ethanol.

In some embodiments the solvent is an alkaline or an acidic solvent. In some embodiments the solvent is an aqueous solution of sodium hydroxide, such as for example 1M sodium hydroxide or 2M sodium hydroxide. In some embodiments the dissolution process also comprises heating the solvent to a temperature in the range of 40-80 degrees C., such as for example 50 degrees C. In some embodiments the dissolution is assisted by application of agitation and/or ultrasonication.

In step f, the molded article is rinsed to ensure complete elimination of mold residues.

In a preferred embodiment, the printing and the filling of the mold takes place in two steps independently of each other and preferably in two different apparatuses to increase total process throughput.

In some embodiments at least two of the process steps a, b, c, d, e and f are performed independently of each other using different apparatuses. In such cases the sacrificial mold needs to be transferred from one apparatus to another apparatus during the method of the present invention. In one preferred embodiment, the transfer is performed manually. In another preferred embodiment, the transfer is performed automatically. In yet another preferred embodiment the transfer is performed by a combination of manually and automatically transfers. Examples of transfers that can be performed manually and/or automatically are disclosed in International patent application no. PCT/EP2017/055841, which is incorporated herein by reference.

In preferred embodiments, the combination of printing a mold and using said printed mold in a subsequent molding process is as described in International Patent Application no. PCT/EP2017/055841, which is incorporated herein by reference.

EXAMPLES

Example 1

Materials

M3190 (TMP(EO)9TA): trimethylolpropane(EO)9 triacrylate purchased from Rahn AG

M284 (PEG300DA): acrylate poly ethylene glycol (PEG) purchased from Rahn AG

ACMO: acryloyl morpholine purchased from Rahn AG

TPO: diphenyl(2,4,6-trimethylbenzoyl)phosphine oxide (photo-initiator) purchased from Rahn AG Tinopal OB 100: benzoxazole, 2,2'-(thiophenediyl)bis[5-(1,1-dimethylethyl)] (UV-blocker) purchased from BASF Corporation 1.1 Preparation of Dissolvable Resin Formulation 30 grams of M3190, 30 grams of M284 and 140 grams of ACMO were poured into an opaque brown PE bottle and mixed to a homogenous texture on a magnetic stirrer. After stirring for no less than 5 minutes the TPO (photo-initiator) and the Tinopal OB 100 (UV-blocker) were added and stirring was continued for 120 minutes on the magnetic stirrer.

1.2 Printing the Sacrificially Additively Manufactured Mold

In order to form the mold with a mold cavity having the desired shape, the dissolvable resin was solidified in a process that involves curing of the resin. Additive manufacturing based on the UV-DLP principle is a preferred method and comprises placing the resin in a suitable container in an additive manufacturing apparatus. The container comprises a transparent bottom through which the resin is selectively exposed to a suitably configured UV ray from a laser or bundle of rays from a DLP projector to promote selective solidification. Alternatively, selective solidification may be achieved by employing projectors that project light onto a build surface placed immediately below an upper resin surface.

An UV-DLP projector with a 365 nm wave length was placed below the container with the transparent bottom and was configured to project light through the container bottom and onto a build surface having an area of 48×60 mm. The build surface was moved away from the projector either continuously or in steps and UV light was projected onto the build surface before, during or after each step.

In the example, the mold having a mold cavity with the desired shape was prepared as follows:
  a. positioning the build surface one layer thickness above an upper surface of the container bottom,
  b. selectively projecting light onto those areas of the resin that are to be solidified to create a first solidified geometry comprising a burn-in layer,
  c. moving the build surface one layer thickness away from the projector and the bottom of the container to allow uncured resin to flow into the area below the solidified area,
  d. interchangeable repeating the selective exposure to create subsequent burn-in layers/solidified geometries and the stepwise motion of the build surface away from the bottom of the container a desired number of times to create one mold with a mold cavity having a desired shape.

The set of parameters used for solidification of the resin comprised a light intensity of 8.1711 mW/cm$^2$, an exposure time for first (burn-in) layers of 4500 milliseconds and an exposure time for subsequent non-burn-in layers of 750 milliseconds.

After creation of the last selectively exposed geometry, the build surface was removed from the additive manufacturing apparatus. The at least one mold was removed from the build surface, and cleaned by immersion in a vat containing isopropanol in an Elmasonic P120H at 40 kHz. Two cleaning circles having each a duration of 10 minutes were run. Then the mold was further cleaned using pressurized air.

Thereafter the cleaned mold was placed in a UV post-curing unit to ensure that full solidification was achieved. In this step an NK-Optik G171 with 9.000 flashes was used.

1.3 Injection Molding an Article

The injection molded article was produced using an A.B. Plastic Injectors AB-200, semi-automatic tabletop plastic injection machine. To support the mold during the injection process, an injection molding tool comprising a cavity having an inner geometry corresponding with the outer geometry of the dissolvable mold was used. The molded article was made of thermoplastic polypropylene and the injection machine barrel with the polypropylene was heated to 245 degrees C., the injection time was set to 3 seconds and the injection pressure was set to 65 psi (corresponding to 0.4 MPa).

1.4 Dissolution of the Sacrificially Additively Manufactured Mold

The dissolvable mold was removed from the molded article by immersing the dissolvable mold in a 500 mL jar with a tight lid that was filled to ¾ of its capacity with 1M sodium hydroxide. The jar was then heated to 50 degrees C. and held there for 24 hours. After dissolution of the mold was completed the molded article was cleaned from any residue with 1M sodium hydroxide followed by immersion in isopropanol and finally drying.

Example 2

In this example the dissolvable resin formulation comprises an epoxy casting resin. The addition of epoxy casting resins to the dissolvable resin, and the subsequent thermal post-curing of additively manufactured molds made with this resin, will result in molds having a higher mechanical strength, thermal stability and thermal capacity than additively manufactured molds manufactured from dissolvable resin formulations that do not comprise such epoxy additives and are not subjected to thermal post-curing, such as for example the one manufactured in Example 1.

Materials

M3190 (TMP(EO)9TA): trimethylolpropane(EO)9 triacrylate purchased from Rahn AG

M284 (PEG300DA): acrylate poly ethylene glycol (PEG) purchased from Rahn AG

ACMO: acryloyl morpholine purchased from Rahn AG

TPO: diphenyl(2,4,6-trimethylbenzoyl)phosphine oxide (photo-initiator) purchased from Rahn AG Tinopal OB 100: benzoxazole, 2,2'-(thiophenediyl)bis[5-(1,1-dimethylethyl)] (UV-blocker) purchased from BASF Corporation Monopox 6093: epoxy casting resin purchased from Delo AG 2.1 Preparation of Dissolvable Resin Formulation 30 grams of M3190, 30 grams of M284, 140 grams of ACMO and 5 grams of Monopox 6093 were poured into an opaque brown PE bottle and mixed to a homogenous texture on a magnetic stirrer. After stirring for no less than 5 minutes the TPO (photo-initiator) and the Tinopal OB 100 (UV-blocker) were added and stirring was continued for 120 minutes on the magnetic stirrer.

2.2 Printing the Sacrificially Additively Manufactured Mold

In order to form the mold with a mold cavity having the desired shape, the dissolvable resin was solidified in a process that involves curing of the resin. Additive manufacturing based on the UV-DLP principle is a preferred method and comprises placing the resin in a suitable container in an additive manufacturing apparatus. The container comprises a transparent bottom through which the resin is selectively exposed to a suitably configured UV ray from a laser or bundle of rays from a DLP projector to promote selective solidification. Alternatively, selective solidification may be achieved by employing projectors that project light onto a build surface placed immediately below an upper resin surface.

An UV-DLP projector with a 365 nm wave length was placed below the container with the transparent bottom and was configured to project light through the container bottom and onto a build surface having an area of 48×60 mm. The build surface was moved away from the projector either continuously or in steps and UV light was projected onto the build surface before, during or after each step.

In the example, the mold having a mold cavity with the desired shape was prepared as follows:
a. positioning the build surface one layer thickness above an upper surface of the container bottom,
b. selectively projecting light onto those areas of the resin that are to be solidified to create a first solidified geometry comprising a burn-in layer,
c. moving the build surface one layer thickness away from the projector and the bottom of the container to allow uncured resin to flow into the area below the solidified area,
d. interchangeable repeating the selective exposure to create subsequent burn-in layers/solidified geometries and the stepwise motion of the build surface away from the bottom of the container a desired number of times to create one mold with a mold cavity having a desired shape.

The set of parameters used for solidification of the resin comprised a light intensity of 8.1711 mW/cm$^2$, an exposure time for first (burn-in) layers of 4500 milliseconds and an exposure time for subsequent non-burn-in layers of 750 milliseconds.

After creation of the last selectively exposed geometry, the build surface was removed from the additive manufacturing apparatus. The at least one mold was removed from the build surface, and cleaned by immersion in a vat containing isopropanol in an Elmasonic P120H at 40 kHz. Two cleaning circles having each a duration of 10 minutes were run. Then the mold was further cleaned using pressurized air.

Thereafter the cleaned mold was placed in a UV post-curing unit to ensure that full solidification was achieved. In this step an NK-Optik G171 with 9.000 flashes was used. To further enhance mold mechanical strength, thermal stability, thermal post-curing at 130 degrees Celsius for 30 minutes was performed.

2.3 Injection Molding an Article

The injection molded article was produced using an A.B. Plastic Injectors AB-200, semi-automatic tabletop plastic injection machine. To support the mold during the injection process, an injection molding tool comprising a cavity having an inner geometry corresponding with the outer geometry of the dissolvable mold was used. The molded article was made of thermoplastic polypropylene and the injection machine barrel with the polypropylene was heated to 245 degrees C., the injection time was set to 3 seconds and the injection pressure was set to 65 psi (corresponding to 0.4 MPa).

2.4 Dissolution of the Sacrificially Additively Manufactured Mold

The dissolvable mold was removed from the molded article by immersing the dissolvable mold in a 500 mL jar with a tight lid that was filled to ¾ of its capacity with 1M sodium hydroxide. The jar was then heated to 50 degrees C. and held there for 24 hours. After dissolution of the mold was completed the molded article was cleaned from any residue with 1M sodium hydroxide followed by immersion in isopropanol and finally drying.

Example 3

In this example the dissolvable resin formulation comprises methyl ethyl ketoxime which is a blocked isocyanate having a first dormant stage and a second reactive stage that occurs above a certain temperature threshold where thermal post-curing occurs. The addition of methyl ethyl ketoxime to the dissolvable resin, and the subsequent thermal post-curing of additively manufactured molds made with this resin, will result in molds having a higher mechanical strength, thermal stability and thermal capacity than additively manufactured molds manufactured from dissolvable resin formulations that do not comprise such methyl ethyl ketoxime additives and are not subjected to thermal post-curing, such as for example the one manufactured in Example 1.

Materials

M3190 (TMP(EO)9TA): trimethylolpropane(EO)9 triacrylate purchased from Rahn AG

M284 (PEG300DA): acrylate poly ethylene glycol (PEG) purchased from Rahn AG

ACMO: acryloyl morpholine purchased from Rahn AG

TPO: diphenyl(2,4,6-trimethylbenzoyl)phosphine oxide (photo-initiator) purchased from Rahn AG Tinopal OB 100: benzoxazole, 2,2'-(thiophenediyl)bis[5-(1,1-dimethylethyl)] (UV-blocker) purchased from BASF Corporation Methyl ethyl ketoxime purchased from Sigma-Aldrich.

3.1 Preparation of Dissolvable Resin Formulation 30 grams of M3190, 30 grams of M284, 5 grams of methyl ethyl ketoxime and 140 grams of ACMO were poured into an opaque brown PE bottle and mixed to a homogenous texture on a magnetic stirrer. After stirring for no less than 5 minutes the TPO (photo-initiator) and the Tinopal OB 100 (UV-blocker) were added and stirring was continued for 120 minutes on the magnetic stirrer.

3.2 Printing the Sacrificially Additively Manufactured Mold

In order to form the mold with a mold cavity having the desired shape, the dissolvable resin was solidified in a process that involves curing of the resin. Additive manufacturing based on the UV-DLP principle is a preferred method and comprises placing the resin in a suitable container in an additive manufacturing apparatus. The container comprises a transparent bottom through which the resin is selectively exposed to a suitably configured UV ray from a laser or bundle of rays from a DLP projector to promote selective solidification. Alternatively, selective solidification may be achieved by employing projectors that project light onto a build surface placed immediately below an upper resin surface.

An UV-DLP projector with a 365 nm wave length was placed below the container with the transparent bottom and was configured to project light through the container bottom and onto a build surface having an area of 48×60 mm. The build surface was moved away from the projector either continuously or in steps and UV light was projected onto the build surface before, during or after each step.

In the example, the mold having a mold cavity with the desired shape was prepared as follows:
a. positioning the build surface one layer thickness above an upper surface of the container bottom,
b. selectively projecting light onto those areas of the resin that are to be solidified to create a first solidified geometry comprising a burn-in layer,
c. moving the build surface one layer thickness away from the projector and the bottom of the container to allow uncured resin to flow into the area below the solidified area,
d. interchangeable repeating the selective exposure to create subsequent burn-in layers/solidified geometries and the stepwise motion of the build surface away from the bottom of the container a desired number of times to create one mold with a mold cavity having a desired shape.

The set of parameters used for solidification of the resin comprised a light intensity of 8.1711 mW/cm$^2$, an exposure time for first (burn-in) layers of 4500 milliseconds and an exposure time for subsequent non-burn-in layers of 750 milliseconds.

After creation of the last selectively exposed geometry, the build surface was removed from the additive manufacturing apparatus. The at least one mold was removed from the build surface, and cleaned by immersion in a vat containing isopropanol in an Elmasonic P120H at 40 kHz. Two cleaning circles having each a duration of 10 minutes were run. Then the mold was further cleaned using pressurized air.

Thereafter the cleaned mold was placed in a UV post-curing unit to ensure that full solidification was achieved. In this step an NK-Optik G171 with 9.000 flashes was used. To further enhance mold mechanical strength, thermal stability, thermal post-curing at 130 degrees Celsius for 30 minutes was performed.

3.3 Injection Molding an Article

The injection molded article was produced using an A.B. Plastic Injectors AB-200, semi-automatic tabletop plastic injection machine. To support the mold during the injection process, an injection molding tool comprising a cavity having an inner geometry corresponding with the outer geometry of the dissolvable mold was used. The molded article was made of thermoplastic polypropylene and the injection machine barrel with the polypropylene was heated to 245 degrees C., the injection time was set to 3 seconds and the injection pressure was set to 65 psi (corresponding to 0.4 MPa).

3.4 Dissolution of the Sacrificially Additively Manufactured Mold

The dissolvable mold was removed from the molded article by immersing the dissolvable mold in a 500 mL jar with a tight lid that was filled to % of its capacity with 1M sodium hydroxide. The jar was then heated to 50 degrees C. and held there for 24 hours. After dissolution of the mold was completed the molded article was cleaned from any residue with 1M sodium hydroxide followed by immersion in isopropanol and finally drying.

What is claimed is:

1. A method for producing a molded article comprising the steps of:
a. printing a sacrificial additively manufactured mold in an additive manufacturing apparatus, said mold having a cavity enclosed by an outer shell comprising a dissolvable radiation-cured material which material (i) in its uncured form is a selectively-curable resin or mixture of selectively-curable resins, and (ii) when cured can withstand plastic melt temperatures in the range of 70-450 degrees C. and injection pressures in the range of 0.2-400 MPa when formed as said outer shell,
b. post-processing the additively manufactured mold obtained in step a,
c. filling the additively manufactured mold obtained in step b with thermoplastic building material using an injection molding process, wherein during said filling, a mold tool configured to receive and hold a build plate of the additive manufacturing apparatus with the sacrificial additively manufactured mold attached thereto is used,
d. processing the building material of step c in order to produce a molded article inside the additively manufactured mold,
e. dissolving the additively manufactured mold in order to release the molded article obtained in step d, and
f. rinsing the molded article,
wherein the sacrificial additively manufactured mold is printed by a method involving photopolymerization.

2. The method according to claim 1, wherein the sacrificial additively manufactured mold is printed by means of UV-Digital Light Processing (DLP); UV, laser, LCD or stencil Stereolithography (SL), continuous liquid interface production (CLIP); Material jetting or Binder jetting; optical fabrication; photo-solidification; solid free-form fabrication; solid imaging; or a droplet/"ink" jet-based system.

3. The method according to claim 1, wherein the sacrificial additively manufactured mold is cured by subjecting the dissolvable radiation-cured material to UV radiation.

4. The method according to claim 1, wherein the post-processing of step b comprises at least one of the following steps: cleaning the mold, drying the mold, surface-treating the mold and post-curing the mold.

5. The method according to claim 4, wherein the sacrificial additively manufactured mold is post-cured by subjecting the mold to UV post-curing or thermal post-curing or a combination of UV post-curing and thermal post-curing.

6. The method according to claim 1, wherein the mold is filled with building material selected from the group consisting of: a thermoplastic polymer, a thermoplastic elastomer, a thermoplastic composite, thermoplastic rubber, a thermoplastic feedstock comprising metal powders, and a thermoplastic feedstock comprising ceramic powders.

7. The method according to claim 1, wherein the mold is filled in step c using one of: thermoplastic injection molding, thermoplastic rubber injection molding, thermoplastic micro injection molding, thermoplastic powder injection molding, thermoplastic metal injection molding, thermoplastic ceramic injection molding, thermoplastic blow molding, thermoplastic over molding, thermoplastic compression molding, thermoplastic insert molding, or thermoplastic multi-shot molding.

8. The method according to claim 1, wherein mold tool has a cavity with dimensions that conform to outer dimensions of the outer shell of the sacrificial additively manufactured mold.

9. The method according to claim 1, wherein the mold tool has dimensions that conform to outer dimensions of the outer shell of the sacrificial mold.

10. The method according to claim 8, wherein the mold tool has a vacuum channel in fluid communication with the mold cavity whereby filling is assisted by drawing a vacuum into said cavity prior to or during filling of the mold in step c.

11. The method according to claim 1, wherein the mold is dissolved in step e by immersing the mold with the molded article in a solvent or a combination of solvents selected from the group consisting of: water, sodium hydroxide, limonene, acetone and ethanol.

12. The method according to claim 1, wherein at least two of the process steps a, b, c, d, e, and f are performed independently of each other in different apparatuses.

13. The method according to claim 12, wherein transfer of the sacrificial additively manufactured mold between the different apparatuses is performed either manually or automatically or the transfer is performed by a combination of manual and automatic transfers.

\* \* \* \* \*